United States Patent [19]

Botz et al.

[11] 4,398,073
[45] Aug. 9, 1983

[54] FASTENING DEVICE FOR A SWITCH

[75] Inventors: Jakob Botz, Ingersheim; Rolf Feger, Bietigheim-Bissingen; Erich Mutschler, Bietigheim-Bissingen; Hubert Spazierer, Bietigheim-Bissingen; Adam Weber, Bietigheim-Bissingen, all of Fed. Rep. of Germany

[73] Assignee: ITT Industries, Inc., New York, N.Y.

[21] Appl. No.: 305,543

[22] Filed: Sep. 25, 1981

Related U.S. Application Data

[60] Division of Ser. No. 126,327, Mar. 3, 1980, Pat. No. 4,327,264, which is a continuation of Ser. No. 898,767, Apr. 21, 1978, abandoned.

[30] Foreign Application Priority Data

Apr. 29, 1977 [DE] Fed. Rep. of Germany ....... 2719194
Dec. 31, 1977 [DE] Fed. Rep. of Germany ....... 2759182

[51] Int. Cl.³ .............................................. H01H 9/02
[52] U.S. Cl. .................................. 200/295; 200/296; 248/27.3; 339/91 R
[58] Field of Search ..................... 339/91 R; 248/27.1, 248/27.3; 200/295, 296

[56] References Cited

U.S. PATENT DOCUMENTS

| 3,337,076 | 8/1967 | Ast | 200/296 |
| 3,366,729 | 1/1968 | Pauza | 248/27.3 |
| 3,814,928 | 6/1974 | Grossean | 248/27.3 |
| 3,866,868 | 2/1975 | Fish et al. | 200/296 |
| 4,072,840 | 2/1978 | Daigle | 200/296 |

FOREIGN PATENT DOCUMENTS 2716042 10/1978 Fed. Rep. of Germany ...... 200/295

Primary Examiner—John W. Shepperd
Attorney, Agent, or Firm—James B. Raden; Donald J. Lenkszus

[57] ABSTRACT

A fastening device which permits snap-in assembly of a switch to a panel or receiving member includes a resilient latching member connected to the switch housing and adapted to engage a shoulder of the receiving member. A second resilient member serves to urge the resilient latching member into contact with the shoulder. In one embodiment of the invention, the switch housing is inserted into a receiving portion of a control panel and a connector carries at least one resilient latching member adapted to engage a shoulder on the receiving portion. In this embodiment, the connector and panel cooperate to retain the switch.

4 Claims, 1 Drawing Figure

U.S. Patent    Aug. 9, 1983    4,398,073
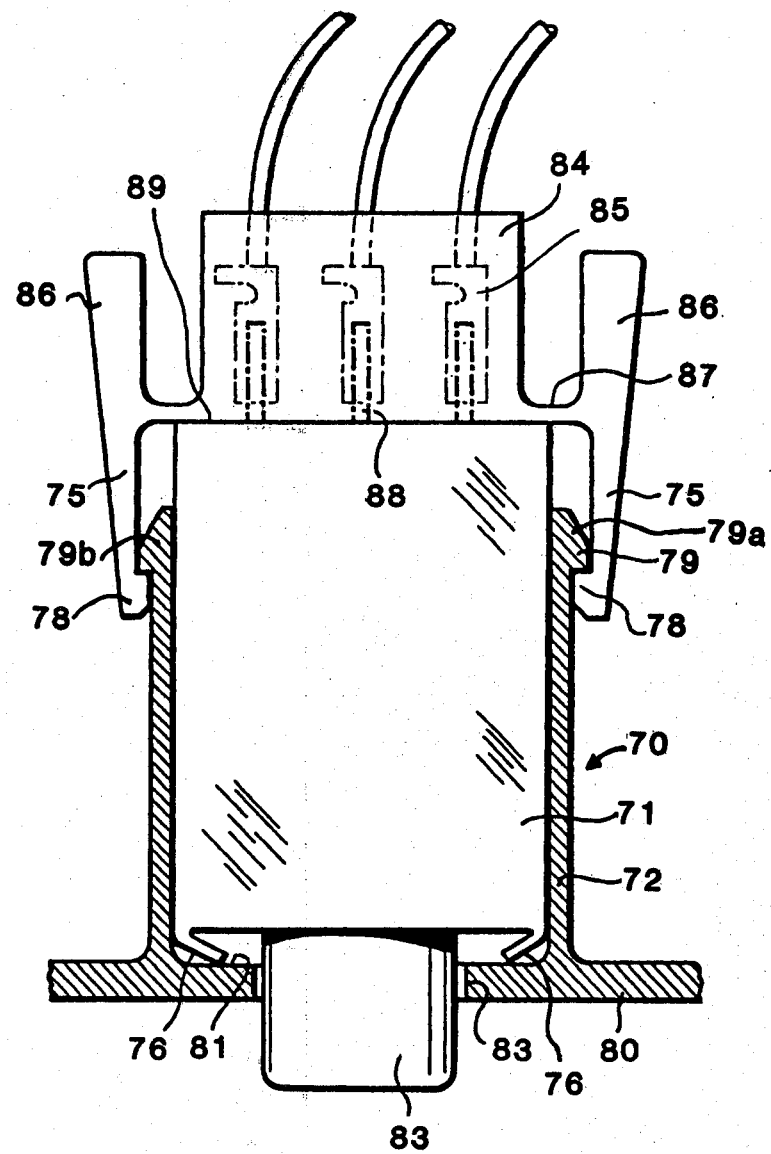

FASTENING DEVICE FOR A SWITCH

This is a division of application Ser. No. 126,327, filed Mar. 3, 1980, now U.S. Pat. No. 4,327,264, which is a continuation of application Ser. No. 898,767, filed Apr. 21, 1978, now abandoned.

BACKGROUND OF THE INVENTION

The invention pertains to fastening devices in general and to a fastening device for mounting an electrical switch in particular.

In mass production, it is desirable to use as few screws as possible to manufacture an assembly including small switches. Nonlocking switches, such as automotive steering column switches, are typically mounted on a receiving member via locking or clamping connections. This receiving member may be an instrument panel, a housing embracing the individual switches or a mounting plate.

In German Pat. No. 1,665,859, an electric tumbler switch is secured to an instrument panel by means of resilient holding elements formed on a housing portion. In this design a precise installation position cannot be guaranteed because of manufacturing tolerances. Furthermore the switch is not easily removable from the housing and therefore the instrument panel may be inadvertently scratched when removing the switch.

It is one object of the invention to create a fastening device for switches of all types which on the one hand guarantees an exactly defined installation position with given tolerances and without play and on the other hand makes possible simplified assembly and disassembly.

SUMMARY OF THE INVENTION

In accordance with the principles of the invention, an arrangement for mounting a switch housing or other component to a panel includes resilient locking or holding elements carried by the switch housing and at least one resilient second element. The resilient locking or holding elements are adapted to engage shoulder portions on a limiting wall of a receiving member. The spring force of each resilient locking or holding member urges the resilient locking or holding member against the limiting wall and the resilient second element provides a spring force against the switch housing in a direction such that the resilient locking or holding elements are urged against the shoulder portions.

With this arrangement, it is possible to secure a switch in the receiving member very exactly with standard manufacturing tolerances and without play. Additionally, the danger of damaging the switch during disassembly is reduced. It is only necessary to release the locking device of the holding element by pressing against the resilient locking or holding elements. The spring action of the second element then presses the switch out of the receiving member so that it can be seized without a tool.

DESCRIPTION OF THE DRAWING

Other features of the invention and the manner of obtaining them will become more apparent, and the invention will be best understood by reference to the following description taken in conjunction with the accompanying drawing which illustrates in partial cross-section a control switch secured to a panel.

DETAILED DESCRIPTION

In the drawing FIGURE a switch housing 71 is pushed into a receiving member 70 which, for instance, is formed on an instrument panel 80. The receiving member includes a side wall 72 which together with the panel 80 forms a cavity for receiving the switch housing. The cavity thus formed includes a portion of the panel as a back or end wall 81. Shoulder 79 is formed on the outside surface of the wall 72. The switch housing 71 includes resilient elements 76 which engage the end wall 81 of the receiving member 72. The switch includes an acutating key 82 which penetrates the end wall 81 via an opening 83.

A connector 84 comprising blade receptacles 85 is laterally provided with holding elements 75. The holding elements include locking lugs 78 which lock behind shoulders 79 of the receiving member 72. The holding elements 75 are connected with a release key 86 and via a movable web 87 with the actual connector 84.

The blade terminals extending out of the switch back wall 89 are designated by 88.

The connector 84 is integrally formed with the movable web 87, and holding elements 75. However, because the webs 87 are of thinner cross-section relative to the holding elements 75, they exhibit greater resiliency.

To disassemble the structure, the release keys 86 are squeezed toward each other thereby causing the locking lugs 78 to flair outward from the shoulder portions 79a, 79b. When the locking lugs 78 clear the shoulder portions 79a, 79b, the spring-like quality of its resilient elements 76 will urge the switch housing out of the cavity and the switch housing and connection may be removed.

To reassemble the structure, the switch housing 71 with attached connector 84, is placed in the cavity and is pushed toward the panel 80 until the lugs 78 ride up and over the shoulder portions 79a, 79b. The assembly is then released. The resilient webs 87 will urge the lugs inward until they engage the outer surfaces of the side wall 72. The resilient members 76 will urge the switch housing away from the end wall 81 until the lugs 78 engage the shoulder portions 79.

What is claimed is:

1. A fastening device for a switching housing comprising:

a receiving member comprising a cavity adapted to receive said switch housing, said cavity having a side wall forming a limiting surface for limiting lateral movement of said switch housing, and an end wall perpendicular to said side wall, said side wall having shoulder portions;

a second member disposed opposite said end wall and adapted to engage one end of said housing, said second member including resilient holding elements each including a portion adapted to engage one of said shoulder portions, each of said resilient holding elements urging its said portion in a first direction into engagement with one of said shoulder portions; and at least one resilient second element disposed between said switch housing and one of said receiving member or said second member for urging said portion in a second direction into engagement with said shoulder, said second direction being substantially perpendicular to said first direction.

2. A fastening device for a switch housing according to claim 1, wherein said second member comprises a connector.

3. A fastening device according to claim 1, further comprising release keys each integrally connected with one of said resilient holding elements; and each of said release keys having an integrally formed movable web connected to said second member.

4. A fastening device according to claim 1, wherein said resilient second member is connected to said switch housing.

* * * * *